US008126495B2

(12) United States Patent
Wu et al.

(10) Patent No.: US 8,126,495 B2
(45) Date of Patent: Feb. 28, 2012

(54) COMMUNICATION APPARATUS

(75) Inventors: Jianming Wu, Kawasaki (JP);
Mitsuhiro Azuma, Kawasaki (JP);
Tomohiko Taniguchi, Kawasaki (JP);
Eisuke Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 604 days.

(21) Appl. No.: 12/257,609

(22) Filed: Oct. 24, 2008

(65) Prior Publication Data
US 2009/0209276 A1 Aug. 20, 2009

(30) Foreign Application Priority Data

Feb. 14, 2008 (JP) .................................. 2008-033462
Sep. 26, 2008 (JP) .................................. 2008-249105

(51) Int. Cl.
*H04B 7/00* (2006.01)
(52) U.S. Cl. .......................... 455/522; 455/447; 370/252
(58) Field of Classification Search .................. 455/522, 455/450, 68, 127.2; 700/73, 55; 375/312, 375/229, 316, 350; 345/84; 333/173
See application file for complete search history.

(56) References Cited

U.S. PATENT DOCUMENTS

| 3,882,504 | A | * | 5/1975 | Currie et al. ................... 342/389 |
| 5,621,763 | A | * | 4/1997 | Walczak et al. ................ 375/312 |
| 6,169,886 | B1 | * | 1/2001 | Black et al. ................ 455/127.2 |
| 2004/0243258 | A1 | * | 12/2004 | Shattil ............................. 700/73 |
| 2004/0253928 | A1 | * | 12/2004 | Jeon et al. ........................ 455/68 |
| 2005/0013386 | A1 | * | 1/2005 | Ojard ............................. 375/316 |
| 2006/0154684 | A1 | * | 7/2006 | Meiyappan ................... 455/522 |
| 2007/0252792 | A1 | * | 11/2007 | Huang ............................. 345/84 |
| 2007/0253372 | A1 | | 11/2007 | Nakayasu |
| 2008/0014951 | A1 | * | 1/2008 | Laroia et al. .................. 455/450 |
| 2009/0082054 | A1 | * | 3/2009 | Li et al. ......................... 455/522 |

FOREIGN PATENT DOCUMENTS

| JP | 2007-295318 | 11/2007 |
| WO | 2007/043782 | 4/2007 |

OTHER PUBLICATIONS

Korean Intellectual Property Office Notice of Preliminary Rejection dated Sep. 13, 2010, and an English-language translation thereof, from the corresponding Korean Application No. 10-2008-106634.
Partial European Search Report dated Mar. 24, 2011, from the corresponding European Application.
Fujitsu: "Technology considerations for LTE-Advanced" 3GPP TSG RAN IMT-Advanced Workshop, Apr. 7-8, 2008, Shenzhen, China.
3GPP TSG-RAN WG1#49, R1-072376, "Further Discussion on Adaptive Fractional Frequency Reuse", Kobe, Japan, May 7-11, 2007.

(Continued)

*Primary Examiner* — Lana N Le
*Assistant Examiner* — Golam Sorowar
(74) *Attorney, Agent, or Firm* — Katten Muchin Rosenman LLP

(57) ABSTRACT

Node-B transmits a power profile of each frequency of transmission data as a step function to a UE. Each UE measures the amount of interference of a received signal, evaluates SINR over the entire frequency band with the power of the received signal, and transmits the evaluation result to Node-B. Node-B evaluates the interference profile in Node-B from the information about the SINR transmitted from the UE and the power of the transmission signal, and determines the frequency profile of the power of the signal transmitted to the UE.

23 Claims, 12 Drawing Sheets

OTHER PUBLICATIONS

3GPP TSG RAN WG1 #49 Meeting, R1-07-2411, "Voice over IP resource allocation benefiting from Interference Coordination", Kobe, Japan, May 7-11, 2007.

3GPP TSG RAN WG1 #50 Meeting, R1-07-3604, "Semi-Static Interference Coordination Method", Athens, Greece, Aug. 20-24, 2007.

Haipeng Lei, et al. "A Novel Multi-Cell OFDMA System Structure Using Fractional Frequency Reuse" The 18th Annual IEEE International Symposium on Personal, Indoor and Mobile Radio Communications (PIMRC '07), Sep. 3-7, 2007.

Draft IEEE 802.16m Evaluation Methodology Document, Dated Submitted: Aug. 28, 2007, http://ieee802.org/16.

European Search Report dated Jul. 15, 2011, from corresponding European Application No. 08 16 7529.

Motorola: "DL Power Allocation for Dynamic Interference Avoidance in E-UTRA" 3GPP TSG RAN1 #46-bis, Oct. 9-13, 2006.

Sharp: "Uplink Inter-cell Interference Management for LTE" 3GPP TSG RAN WG1 Meeting #49, May 7-11, 2007.

* cited by examiner

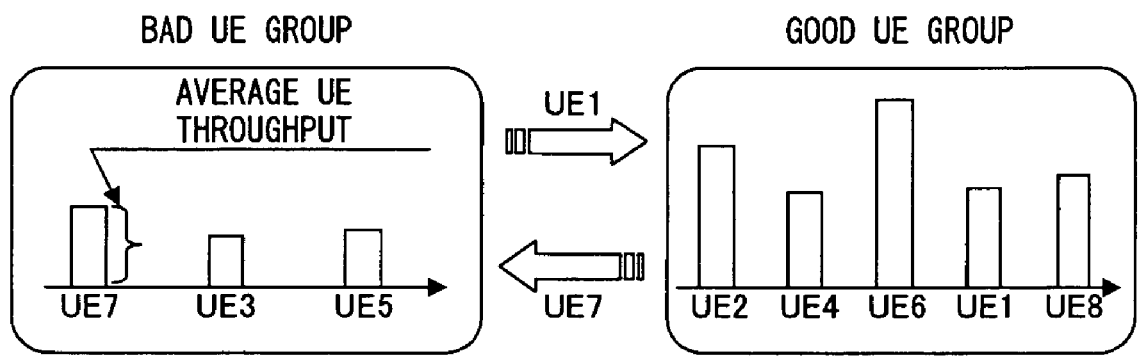
F I G. 9

COMMUNICATION APPARATUS

BACKGROUND OF THE INVENTION

1. Field of the Invention

The present invention relates to a communication apparatus having an FFR (fractional frequency reuse) control mechanism using a step function.

2. Description of the Related Art

Recently, high-speed wireless communications have been developed, and the unit price of a frequency spectrum has been raised as the frequency spectrum has been a resource limited to be efficiently used. In the standard of 1xEV-DO, IEEE802.16E, LTE etc., frequency reuse has been a problem to be considered.

FIGS. 1A through 1D are explanatory views showing various aspects of frequency reuse.

The frequency reuse shown in FIG. 1A has a reuse factor of 1 indicating the sectors of all cells having the same frequency F, and high throughput can be attained when all sectors in a cell operate at the same frequency band. However, the reuse method indicates the possibility that a user of a cell edge receives a degraded signal by the interference from an adjacent cell.

To more effectively cover a use of a cell edge, as shown in FIG. 1B, a ⅓ reuse factor (one cell includes three types of frequencies F1, F2, and F3, and each sector uses one frequency) is used, and frequency planning (the arrangement of frequencies is considered during designing) is provided to limit the reuse to a fractional frequency reuse. FIG. 1C shows the case where no frequency planning is used (the arrangement of frequencies is not considered during designing). An intermediate method can be ⅔ frequency reuse as shown in FIG. 1D. The frequency reuse method refers to the use of two of three frequency bands (F12, F23, or F13)) for one sector.

FIG. 2 shows the comparison of performance of each frequency reuse on the basis of the assumption of IEEE802.16e.

In FIG. 2, the horizontal axis indicates longtime average SNR, and the vertical axis indicates the CDF (cumulative distribution function) indicating the cumulative SNR occurrence rate.

As a result, the full frequency reuse (reuse of 1), and ⅓ frequency reuse (reuse of F⅓) with the frequency planning obtain a gain of 10 dB, and the ⅔ frequency reuse (reuse of F⅔) obtains a gain of 3 dB. The gains are obtained by multiplying the gain of the SNR by a frequency use rate, that is, 1 for the reuse of 1, ⅓ for the reuse of F(R)⅓, and ⅔ for the reuse of F⅔.

Aside from the conventional frequency reuse method, some fractional frequency reuse (FFR) methods are proposed as standards.

One proposition as applicable FFR (non-patent document 1) is using a transmission power level with or without restrictions, and a large coverage gain can be obtained by assigning a set of subcarriers without restrictions to a cell edge user. In this method, a predetermined pattern is used, and the predetermined pattern is reported between adjacent cells through a high layer signaling control channel.

Other methods (non-patent documents 2 and 3) are to similarly consider interference control by reserving a subcarrier configured by high layer signaling control channel. The advantage of the interference control is obtained by assigning to a user a preferable frequency depending on the status of the cell closest to the user.

In the exemplified interference FFR scheme, a high layer control channel is normally required to indicate a transmission power pattern or a reserved subcarrier. Therefore, a system without such a control channel is not available.

[Non-patent Document 1] 3GPP TSG-RAN1 WG1 #49, R1-072376, "Further Discussion on Adaptive Fractional Frequency Reuse", Kobe, Japan, May 7-11, 2007.

[Non-patent Document 2] 3GPP TSG-RAN1 WG1 #49, R1-072411, "Voice over IP resource allocation benefiting from Interference Coordination", Kobe, Japan, May 7-11, 2007.

[Non-patent Document 3] 3GPP TSG-RAN1 WG1 #50, R1-07-3604, "Semi-Static Interference Coordination Method", Athens, Greece, Aug. 20-24, 2007.

SUMMARY OF THE INVENTION

The present communication apparatus aims at providing a communication apparatus capable of controlling the transmission power from a base station in fractional frequency reuse (FFR).

The present communication apparatus uses a fractional frequency reuse system for realizing a downlink transmission power control method in a wireless communication system for wireless communication with a user terminal, and includes a step function determination device for determining a step function, and a transmission device for transmitting a signal having a power profile according to the step function in the frequency direction.

The present communication apparatus can control the transmission power from a basic station in the fractional frequency reuse (FFR).

BRIEF DESCRIPTION OF THE DRAWINGS

FIG. 9 is an explanatory view (2) showing UE grouping;

DESCRIPTION OF THE PREFERRED EMBODIMENTS

In the present embodiment, the downlink power control (to be more correct, power spectrum density (PSD)) from a base station is realized based on a step function. In this scheme, the distribution of the downlink (DL) transmission PSD over the entire band is adjusted by controlling the slope or a segment of the step function based on the interference level autonomously learned from the adjacent cell. Furthermore, a scheduler functions of assigning user equipment (UE) of a cell edge in a subcarrier in which large transmission PSD is distributed. On the other hand, to the UE at the center of the cell, a subcarrier in which small transmission PSD is distributed is assigned. The advantages of the scheme are:

when the number of steps is 3, the invention covers most FFR schemes;

as in the interference control method using other types of FFR, a large user coverage gain can be obtained in this method; and it is not necessary to assign a control channel, and the FFR operation is completely a problem of implementation.

In the present embodiment, a user coverage of a cell edge is improved. A high layer control channel can be eliminated.

In the present embodiment, a new FFR interference control scheme is based on the power control (control of power spectrum density (PSD)) according to a step function.

In the present embodiment, the distribution of the downlink (DL) transmission PSD over the entire band is adjusted by controlling the slope or a segment of the step function based on the interference level autonomously learned from the adjacent cell. Furthermore, a scheduler functions of assigning user equipment (UE) of a cell edge in a subcarrier in which large transmission PSD is distributed. On the other hand, to the UE at the center of the cell, a subcarrier in which small transmission PSD is distributed is assigned.

<Configuration of Step Function>

The step function of x is the maximum integer of x or less. A floor function is described in various methods, but normally expressed by special brackets as follows.

$$\lfloor x \rfloor$$

For example, $$\lfloor 3.6 \rfloor = 3, \lfloor -3.6 \rfloor = -4$$

In the present embodiment, the transformed step function for the FFR interference control is configured using a step function using a step function expressed as follows.

$$\lfloor x \rfloor$$

In the present embodiment, there are some parameters for control of a step function. they are $\alpha$, $\beta$, $\Delta$, M, W, N respectively representing a slope, a segment, a step width of a frequency, a break point of a function (bending point of a function), a frequency area (or band), and the number of steps in an area.

Figure 1:
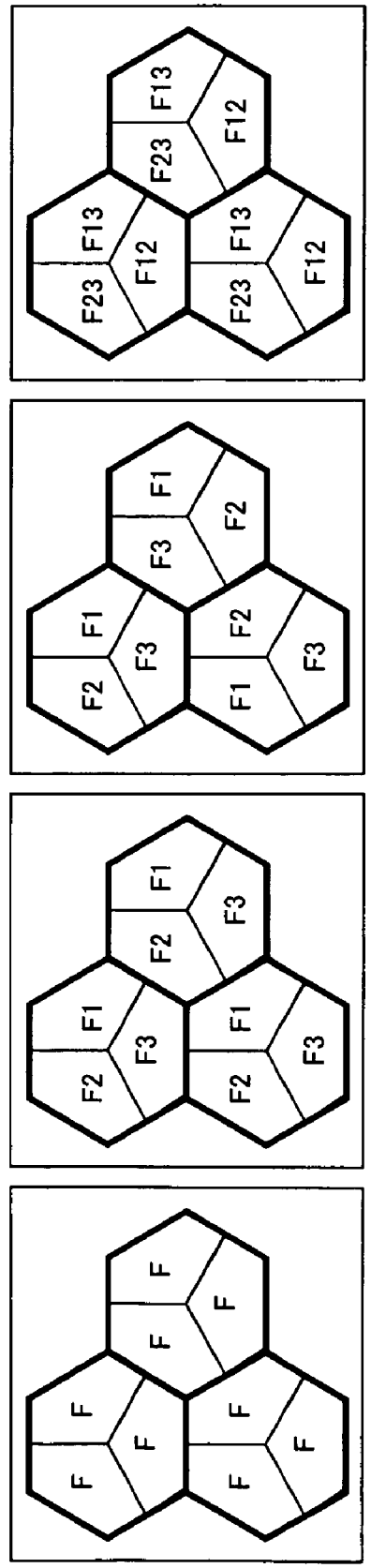
FIGS. 1A through 1D are explanatory view showing various aspects of the frequency reuse.
Figure 2:
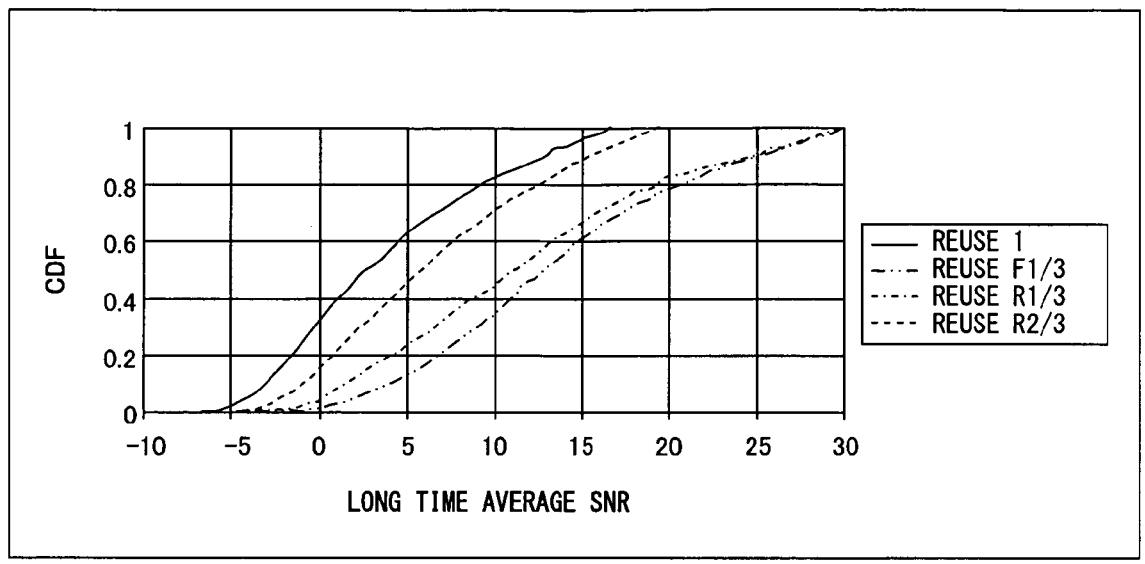
FIG. 2 exemplifies the distribution of the SNR in each frequency reuse aspect.
Figure 3:
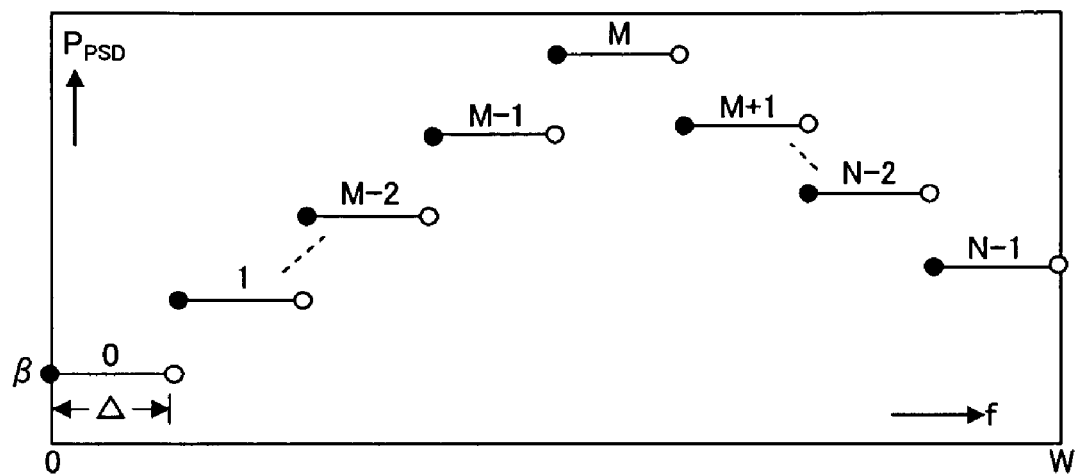
FIG. 3 is an explanatory view showing a step function for a fractional frequency reuse according to an embodiment of the present invention.

FIG. 1 shows a common transformed step function for FFR interference control.

The following relationship holds among the parameters.

$$W = \Delta N \text{ and } n = \left\lfloor \frac{f}{\Delta} \right\rfloor$$

$$\text{for } n = 0, 1, \ldots, M, \ldots, N-1.$$

where f indicates a frequency.

The power spectrum density (PSD) is expressed as follows.

$$p^{(PSD)}(f) = \begin{cases} \alpha_1 \cdot \Delta \cdot \left\lfloor \frac{f}{\Delta} \right\rfloor + \beta_1 & \text{for } 0 \leq f < \Delta(M+1) \\ \alpha_2 \cdot \Delta \cdot \left\lfloor \frac{f}{\Delta} \right\rfloor + \beta_2 & \text{for } \Delta(M+1) \leq f < \Delta N \end{cases} \quad \text{Eq-1}$$

where f indicates a variable of PDS step function $p^{(PSD)}(f)$, $0 \leq f < W$ indicates a frequency band. Furthermore, the following equation holds for M, $\alpha_1$, $\alpha_2$, $\beta_1$, $\beta_2$ where M indicates a break point.

$$\Delta M (\alpha_1 - \alpha_2) = \beta_2 - \beta_1.$$

On a special occasion, M equals 0 or N−1, and the step function above is a linear step function indicating a simple increase or a simple decrease. When $\alpha_1 = -\alpha_2 = \alpha$, $\beta_1 = \beta$, the step function of the PSD is simplified as follows.

$$p^{(PSD)}(f) = \begin{cases} \alpha \cdot \Delta \cdot \left\lfloor \frac{f}{\Delta} \right\rfloor + \beta & \text{for } 0 \leq f < \Delta(M+1) \\ \alpha \cdot \Delta \cdot \left\{ 2M - \left\lfloor \frac{f}{\Delta} \right\rfloor \right\} + \beta & \text{for } \Delta(M+1) \leq f < \Delta N \end{cases}$$

The step function above can be applied to all FFR methods including the frequency hard reuse (FIG. 1B) and an adaptive FFR control pattern.

Figure 4A:
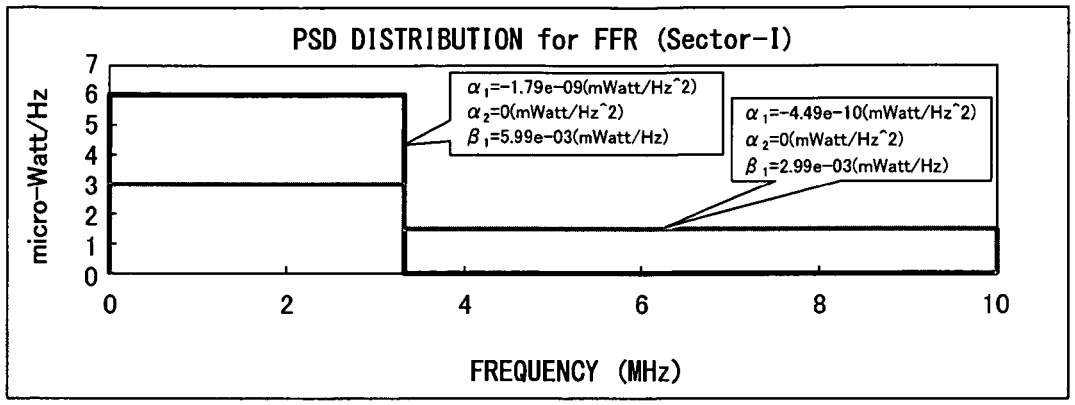
FIGS. 4A through 4C are explanatory view showing the power frequency profile of hard frequency reuse using a step function.
Figure 4B:
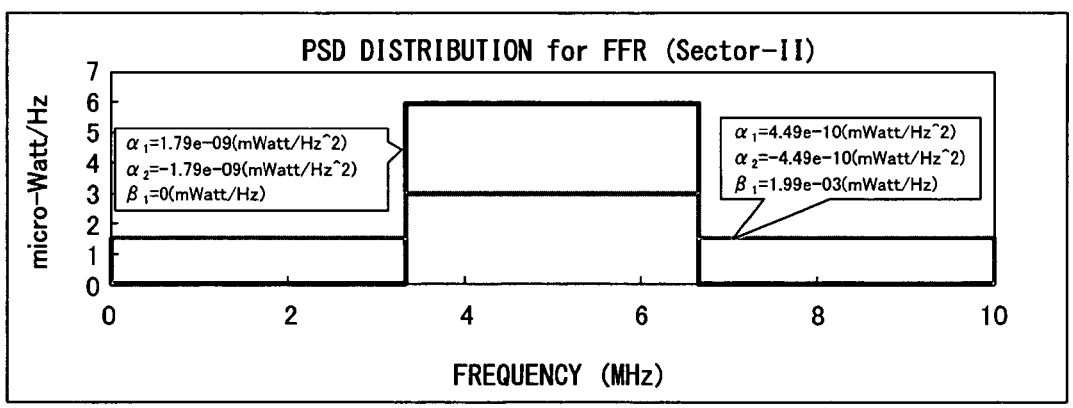
Figure 4C:
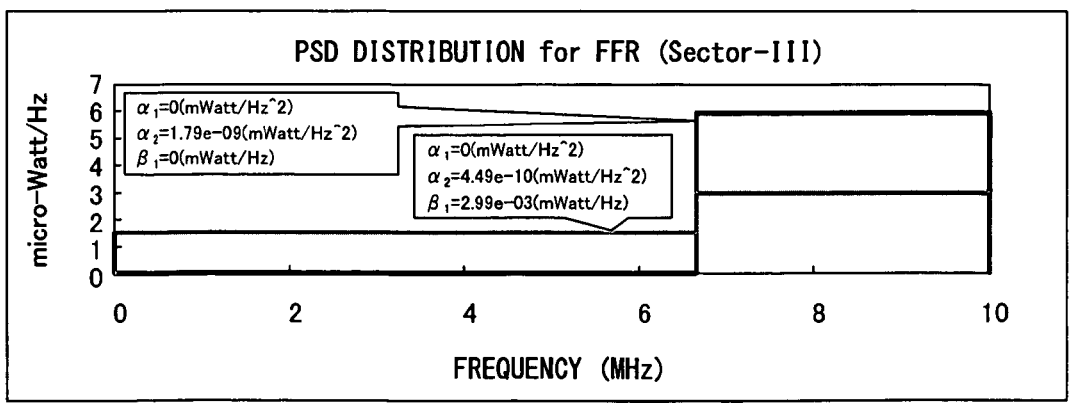

FIGS. 4A through 4C are explanatory views of the frequency hard reuse using a step function.

In FIGS. 4A through 4C, the horizontal axis indicates a frequency, and the vertical axis indicates a PSD distribution in mW/Hz. In the sector 1, the bands from 0 MHz to 3.3 MHz are assigned. However, depending on the value of the parameter, the power of the band from 0 MHz to 3.3 MHz is reduced, and the power of other bands can be increased. In FIG. 4A, in Eq-1 above, $\alpha_1 = -1.79e-09$ (mW/Hz$^2$), $\alpha_2 = 0$ (mW/Hz$^2$), $\beta_1 = 5.99e-03$ (mW/Hz) is expressed by bold lines. Thin lines are used when $\alpha_1 = -4.49e-10$ (mW/Hz$^2$), $\alpha_2 = 0$ (mW/Hz$^2$), $\beta_1 2.99e-03$ (mW/Hz). In FIG. 4B, bold lines indicate the case when $\alpha_1 = -1.79e-09$ (mW/Hz$^2$), $\alpha_2 = 1.79e-09$ (mW/Hz$^2$), $\beta_1 = 0$ (mW/Hz) while thin lines indicate the case when $\alpha_1 = -4.49e-10$ (mW/Hz$^2$), $\alpha_2 = -4.49e-10$ (mW/Hz$^2$), $\beta_1 = 1.99e-03$ (mW/Hz). The bold lines shown in FIG. 4C indicate the case when $\alpha_1 = 0$ (mW/Hz$^2$), $\alpha_2 = 1.79e-09$ (mW/Hz$^2$), $\beta_1 = 0$ (mW/Hz) while the thin lines indicate the case when $\alpha_1 = 0$ (mW/Hz$^2$), $\alpha_2 = 4.49e-10$ (mW/Hz$^2$), $\beta_1 = 2.99e-03$ (mW/Hz). FIG. 4B shows the frequency allocation to the sector 2, and FIG. 4C shows the allocation of the frequency to the sector 3. In any sector, the portion of the largest power has no overlapping bands.

<Step Function Control Factor>

In the present embodiment, a step function includes a number of parameters such as $\alpha_1$, $\alpha_2$, $\beta_1$, $\beta_2$, $\Delta$, N, M, etc. $\Delta$ and N are fixed parameters that can be predetermined. A controllable parameters are $\alpha_1$, $\alpha_2$, $\beta_1$, $\beta_2$, M.

In the downlink, the full transmission power over the entire bands is normally fixed. By using an equation for maintain constant full transmission power over the entire bands as a conditional expression, controllable factors are limited to three. In the description below, control parameters are slopes $\alpha_1$, $\alpha_2$ and a segment $\beta_1$. When the full transmission power over the entire bands is a constant P, the full transmission power is given below using Eq-1.

$$P = \int_0^{\Delta(M+1)} \left(\alpha_1 \cdot \Delta \cdot \left\lfloor \frac{f}{\Delta} \right\rfloor + \beta_1\right) df + \int_{\Delta(M+1)}^{\Delta N} \left(\alpha_2 \cdot \Delta \cdot \left\lfloor \frac{f}{\Delta} \right\rfloor + \beta_2\right) df$$

$$= \beta_1 \Delta (M+1) + \alpha_1 \Delta^2 \frac{M(M+1)}{2} + \beta_2 \Delta (N-M-1) + \alpha_2 \Delta^2 \frac{(N-M-1)(M+N)}{2}$$

$$= \beta_1 \Delta N + \alpha_1 \Delta^2 \frac{M(2N-M-1)}{2} + \alpha_2 \Delta^2 \frac{(N-M-1)(N-M)}{2}$$

$$= \beta_2 \Delta N - \alpha_1 \Delta^2 \frac{M(M+1)}{2} + \alpha_2 \Delta^2 \frac{N(N-1) + M(M+1)}{2} \quad \text{Eq-2}$$

As a result, the slope $\alpha_1$, $\alpha_2$ and the segment $\beta_1$ are determined, and M and $\beta_2$ are easily derived. Furthermore, under the condition $\alpha_1 = -\alpha_2 = \alpha$, Eq-2 is simplified into $$P = \beta \Delta N + \frac{\alpha \Delta^2}{2} \cdot (4MN - 2M^2 - 2M - N^2 + N). \quad \text{Eq-3}$$

Therefore, the controllable factors are reduced into two.

<Determining UE Step Function>

The UE step function required for each UE is defined by a step function determined by an interference profile. A UE step function is used to determine a Node-B transmission PSD step function (sector step function) by a Node-B (base station). To describe how a UE step function is used in interference control based on the FFR, it is necessary to understand the behavior of the interference by another Node-B.

The transmission PSD from any Node-B is distributed over the entire bands based on a transformable step function.

Received interference is averaged for a long time in a time area, and the received interference level is stabilized. If the transmission PSD depends on a step function, the interference profile received over the entire frequency bands largely depends on the step function.

Therefore, the PSD of the total interference received by the j-th UE stored in the g-th Node-B in the interference from K Node-Bs is expressed as follows.

$$I_{g,i}^{(PSD,Rx)}(f) = \sum_{k=0, k \neq g}^{K-1} P_k^{(PSD)}(\alpha_{k,1}, \alpha_{k,2}, \beta_k, M_k, f) \cdot L_{k,j}$$

where $P^{(PSD)}_k(\alpha_{k,1}, \alpha_{k,2}, \beta_k, M_k, f)$ indicates the PSD transmitted by the k-th Node-B, $\alpha_{k,1}$, $\alpha_{k,2}$ indicates a slope, $\beta_k$ indicates a segment, $M_k$ indicates a break point, $L_{k,j}$ indicates a transmission line loss between the j-th UE and the k-th Node-B, and K indicates the number of Node-Bs including the Node-B in problem.

To allow the interference PSD profile in the Node-B as a total interference PSD profile (step function) received from each UE to function as a step function, it is preferable to satisfy the following two conditions.

The number of steps of N is odd.

The break point $M_k$ of the step function of all UEs is the center of all frequency bands. That is, the following equation holds.

$$M = \left\lfloor \frac{N}{2} \right\rfloor$$

As a result, the number of controllable factors is two for Eq-2, and one for Eq-1.

Each UE can measure the interference that is normally received from another Node-B, and each UE knows the interference profile.

$$I_{g,i}^{(PSD,Rx)}(f)$$

For the g-th UE, Node-B checks the highest SINR (signal to interference and noise ratio) in all areas. When the SINR is not sufficiently high as compared with a predetermined target value, the transmission PSD is to be raised, and vice versa. The optimizing reference for description of the transmission PSD of the UE step function $$P_{g,i}^{(PSD)}(f)$$

from the j-th Node-B (transmission Node-B) desired by the g-th UE is to optimize $$\max_{\alpha_{l,i,1}, \alpha_{l,i,2}, \beta_{l,i,1}, \beta_{l,i,2}} \sum_{n=0}^{N-1} p_{g,i}(n) \cdot \log_2[1 + \Gamma_{g,i}(n, \alpha_{g,i,1}, \alpha_{g,i,2}, \beta_{g,i,1}, \beta_{g,i,2})]$$

under the condition of $$P_{g,i}^{(PSD)}(f) \geq P_{min},$$

$$P = \beta_{g,i,1} \Delta N + \alpha_{g,i,1} \Delta^2 \frac{M(2N-M-1)}{2} + \alpha_{g,i,2} \Delta^2 \frac{(N-M-1)(N-M)}{2},$$

$$\Delta M(\alpha_{g,i,1} - \alpha_{g,i,2}) = \beta_{g,i,2} - \beta_{g,i,1} \cdot P_{g,i}^{(PSDmax)}(\Delta m_{l,i}) + \eta_{g,i} \delta =$$

$$\begin{cases} \alpha_{g,i,1} \Delta m_{g,i} + \beta_{g,i,1} & \text{for } m_{g,i} \leq M \\ \alpha_{g,i,2} \Delta m_{g,i} + \beta_{g,i,2} & \text{for } m_{g,i} > M \end{cases}$$

where $\delta$ indicates an offset ($\delta$ is the same as the power control step of the size of 1 or 1 dB) of the transmission PSD predetermined by a system, $\eta_{g,i}$ indicates a weight factor $\eta_{g,j} = \{-1, 0, 1\}$) determined as follows, $p_{g,j}(n)$ is the allocation probability of the n-th channel to the j-th UE transmitted by the g-th Node-B. $\Gamma_{g,j}(n, \alpha_{g,j,1}, \alpha_{g,j,2}, \beta_{g,j,1}, \beta_{g,j,2})$ is an evaluation value of the received SINR of the j-th UE from the q-th Node-B.

$$\Gamma_{g,i}(n, \alpha_{g,i,1}, \alpha_{g,i,2}, \beta_{g,i,1}, \beta_{g,i,2}) = \frac{P_g^{(PSD)}(\Delta n, \alpha_{g,i,1}, \alpha_{g,i,2}, \beta_{g,i,1}, \beta_{g,i,2}) \cdot L_{g,i}}{I_{g,i}^{(PSD,Rx)}(\Delta n) + N_0}$$

$L_{g,j}$ indicates a transmission line loss of the J-th UE transmitted by the g-th Node-B. The channel allocation probability $p_{g,j}(n)$ is empirically obtained or simply 1/N. To control a UE step function is to design a transmission PSD profile that guarantees the system performance of the UE in a worse state by selecting a weight factor $\eta_{g,i}$. Therefore, each UE transmitted by the g-th Node-B checks the preceding SINR, $\Gamma^{(prev,max)}_{g,j}$, and determines the currently predicted SINR, $\Gamma^{(curr,max)}_{g,j}(n)$.

It means that the current transmission PSD predicted by each UE can be determined by the preceding sector step function. Therefore, the following algorithm is considered.

Figure 5:
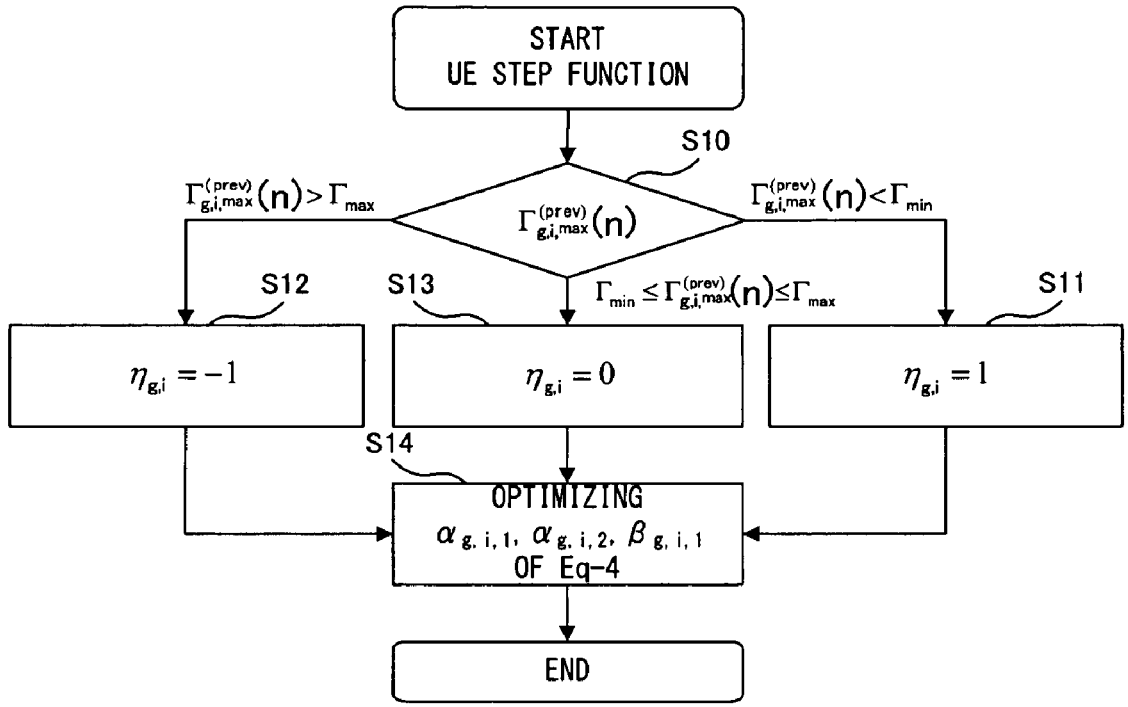
FIG. 5 is a flowchart of the process of determining an UE step function.

FIG. 5 is a flowchart of the process of determining a UE step function.

In each sector, in all UEs, the Node-B sets each PSD for UEs ($U_{worse}$) experiencing inferior performance. The PSD of each UE attains the highest SINR at the n-th step as follows.

$$\Gamma_{min} \leq \Gamma_{gj,max}(n) \leq \Gamma_{max} \text{ for } n=\{O, M, N-1\}$$

where $\Gamma_{gj,max}(n)$ is the highest SINR in the n-th step in the N steps, and $\Gamma_{max}$ and $\Gamma_{min}$ are the highest and the lowest SINR as the system parameters configured by Node-B. In step S10, the size of $\Gamma^{(prev)}_{gj,max}(n)$ is determined by the following reference.

When $\Gamma^{(prev)}_{gj,max}(n) < \Gamma_{min}$, the SINR in the n-th step is updated by the following relationship.

$$\Gamma^{(curr)}_{gj,max}(n) = \Gamma^{(prev)}_{gj,max}(n) + \delta$$

where $\delta$ is an offset of the transmission PSD, represented by dB, and controls the highest SINR over the entire band. In this case, $\eta_{gi}=1$ (step S11).

When $\Gamma^{(prev)}_{gj,max}(n) > \Gamma_{max}$, the SINR in the n-th step is updated by the following relationship.

$$\Gamma^{(curr)}_{gj,max}(n) = \Gamma^{(prev)}_{gj,max}(n) - \delta$$

In this case, $\eta_{gi}=-1$ (step S12).

When $\Gamma_{min} \leq \Gamma^{(prev)}_{gj,max}(n) \leq \Gamma_{max}$, it is not necessary to update SINR in the n-th step. In this case, $\eta_{gi}=0$ (step S13).

This algorithm simplifies the optimization problem and speeds up the convergence to a target value of the SINR of each UE. The initial value of the slope of the step function is set to $\alpha_1=\alpha_2=0$, and the point of the highest SINR is set at random at any of the points of n=0, n=M, or n=N-1.

<Determining Sector Step Function>

Figure 6:
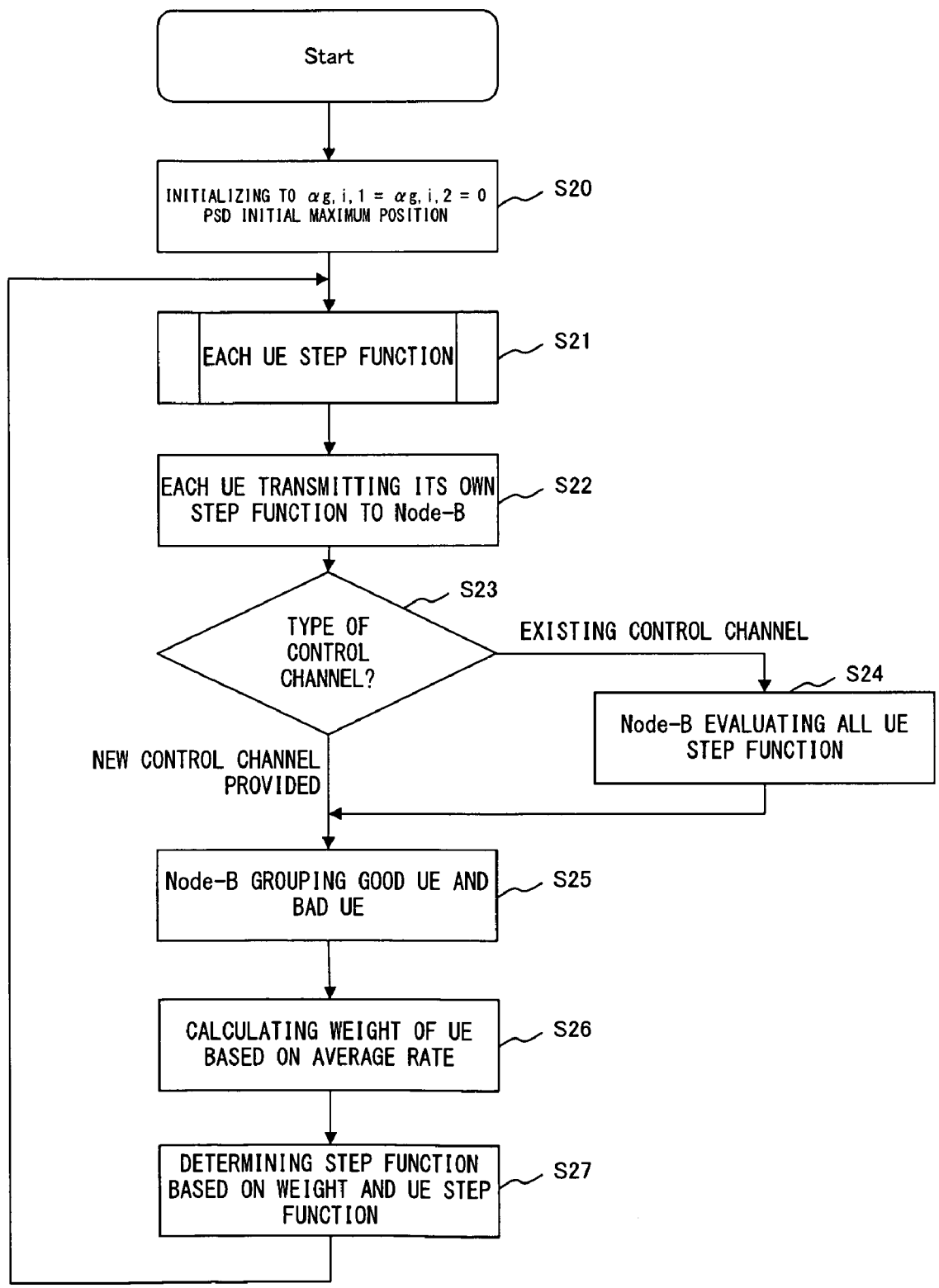
FIG. 6 is a flowchart of controlling fractional frequency reuse using a step function.

FIG. 6 is a flowchart of the process of determining a sector step function.

The initial step function is set as $\alpha_{1gj,1}=\alpha_{2gj,2}=0$, and the point of the highest SINR is set at random at any of the points of n=0, n=M, or n=N-1 (step S20). Each UE sets a UE step function, and transmit the function to the transmission Node-B using a control channel directly or indirectly using the control channel such as a CQI feedback channel etc. (step S21).

In step S23, the type of control channel is determined. If the control channel is an existing control channel, Node-B evaluates all UE step functions in step S24, and control is passed to step S25. If the control channel is a new control channel as a result of the determination in step S23, Node-B groups UEs in a good reception state and UEs in a bad reception state in step S25. That is, Node-B divides all UEs into two groups. One is a UE group including $U^{(BG)}$ UEs of better coverage, and the other is a UE group including $U^{(WG)}$ UEs of worse coverage. In step S26, a weight (priority) is calculated for each UE on the basis of each coverage rate. In the UE group of better coverage of reception state, a weight factor $\rho_{gj}$ is set to 0 for the j-th UE communicating with the g-th Node-B. In the UE group of worse coverage of reception state, a weight factor $\rho_{gj}$ of the j-th UE communicating with the g-th Node-B is set by the following equation.

$$\rho_{g,i} = \frac{(T_{g,i})^{-1}}{\sum_{k=0}^{U^{(WG)}-1} (T_{g,k})^{-1}}$$

where $T_{gj}$ indicates an average rate of the j-th UE communicating with the g-th Node-B.

Only on the group UE of worse reception state, a step function $P^{(PSD)}_g(f)$ is determined for a communicating Node-B (step S27). The determination equation is given as follows.

$$P^{(PSD)}_g(f) = \sum_{i=0}^{U^{(WG)}-1} \rho_{g,i} \cdot P^{(PSD)}_{g,i}(f)$$

<Interference Profile Evaluation on the Basis of CQI>

It is necessary for each UE to notify Node-B of a UE step function to receive a signal with the optimum power. When all data is collected, Node-B communicating with a UE determines a transmission PSD step function. Each UE can transmit the function to Node-B in two methods.

A new control channel is provided for transmission from each UE to Node-B.

Using an existing control channel, Node-B evaluates a UE step function.

The first method is simple and correct, but requires the cost of providing a new control channel between the UE and Node-B. The second method is further practical. Described below is the second method in Node-B using an existing feedback channel quality indication (CQI) from each UE.

The CQI evaluation by each UE is based on the common reference symbol (RS) from Node-B communicating with a UE. The CQI includes modulation code scheme (MCS) or a signal-to-interference noise ratio (SINR) level of each subband. In the description below, it is assumed that the CQI is reception SINR.

An RS is arranged on a two-dimensional frequency time plane of a predetermined pattern. Each Node-B adopts a pattern shifted depending on a sector ID to avoid an RS conflict between sectors. The transmission PSD of an RS is constant over the entire bands known in advance.

In the CQI feedback, only the CQI is fed back regardless of the total number of CQIs in the entire frequency bands.

The smallest CQI band width is equal to the step function width $\Delta$. The feedback CQI is averaged for stability for a long time in a time area. By the reception interference profile over the entire bands and a step function, a long-time CQI evaluated from a moment feedback CQI is to have the same step function property. It is used in determining a step function by the j-th UE parameter $\alpha^{(sin\,r)}_{gj,1}, \alpha^{(sin\,r)}_{gj,2}, \beta^{(sin\,r)}_{gj,1}$ communicating with the g-th Node-B. The procedure of evaluating the PSD of the received interference profile $I^{(psd,Rx)}_{gj}(f)$ is described below.

Each UE evaluates received SINR by measuring the received RS and received interference. The measurement device is supported by a number of systems. Each UE feeds back SINR or an MCS as a part of the CQI to Node-B communicating with the UE. It is supported by a number of systems.

Node-B evaluates a step function on the basis of a reported SINR or MCS (Estimate-I). The calculation equation is given as follows.

$$\Gamma_{g,i}(n) = \begin{cases} \alpha^{(SINR)}_{g,i,1} \Delta n + \beta^{(SINR)}_{g,i,1} & \text{for } 0 \leq n < M+1 \\ \alpha^{(SINR)}_{g,i,2} \Delta n + \beta^{(SINR)}_{g,i,2} & \text{for } M+1 \leq n < N \end{cases}$$

where $\Gamma_{g,j}(n)$ is SINR reported as a function of the step index n from the j-th UE communicating with the g-th Node-B. Node-B multiplies a long-time channel gain $L_{g,j}$ (reported by Node-B in a number of systems) by transmission RS PSD, $P^{(PSD, Pilot)}_{g,j}$, and evaluates the received PSD from each UE as $P^{(PSD, RS)}_{g,j} \cdot L_{g,j}$.

By performing a division by Estimate-I and Estimate-II, Node-B can easily evaluate the interference PSD for each UE as follows.

$$I^{(PSD,Rx)}_{g,i}(n) = \frac{P^{(PSD,RS)}_{g,i} \cdot L_{g,i}}{\Gamma_{g,i}(n)}.$$

Figure 7:
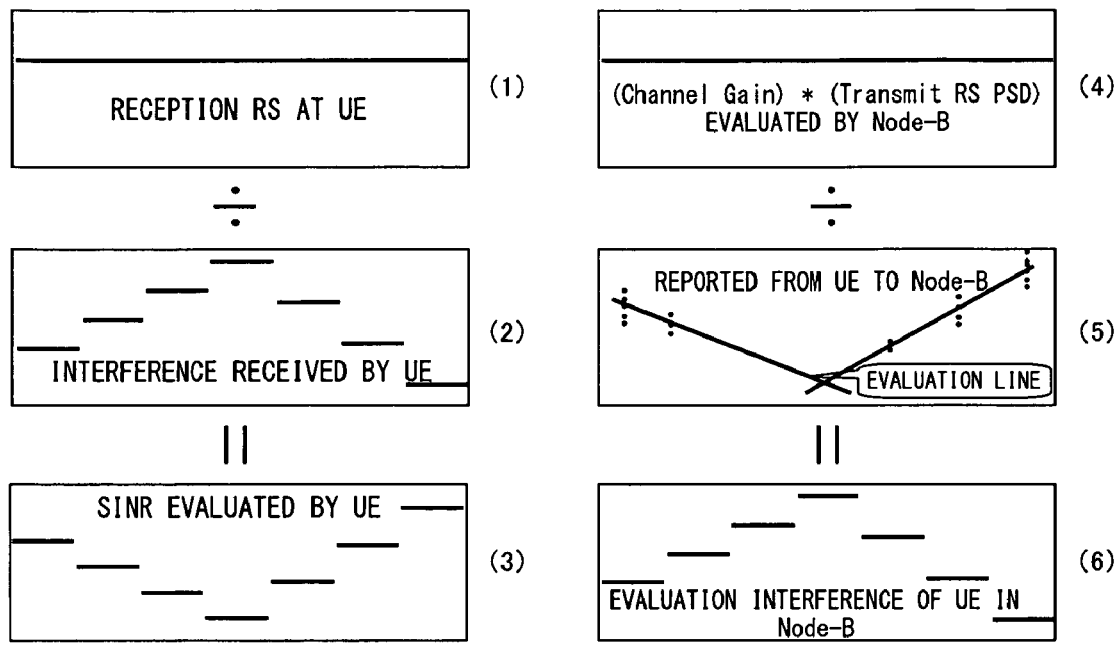
FIG. 7 is an intuitional explanatory view of an interference amount evaluating method based on a CQI.

FIG. 7 is an intuitional explanatory view of an interference evaluating method using a CQI.

(1) in FIG. 7 is a spectrum of the received RS (received signal) at an UE. In this example, it is constant over the range of the frequency. In the value of (2) in FIG. 7, (3) in FIG. 7 as a result of performing a division on (1) in FIG. 7 is the SINR evaluated by the UE. Next, assume that (4) in FIG. 7 is obtained by multiplying the (channel gain) evaluated by Node-B by (transmission RS PSD). The result is divided by the SINR reported by Node-B from the UE of (5) in FIG. 7, and the result of the division is (6) in FIG. 7 is an evaluation value of the interference of the UE in Node-B.

<Proportional Equality Scheduler>

A Proportional equality scheduler performs a metric calculation on all resources and all UEs in a predetermined schedule interval. The UE having the highest metric in a fixed schedule resource is assumed to be active until all resources are assigned. The metric is updated after scheduling each resource.

the metric $\Phi_{g,i}(t)$ for the i-th UE communicating with the g-th Node-B is given in the following equation in the schedule subframe t.

$$\Phi_{g,i}(t) = \frac{R^{(Inst)}_{g,i}(t)}{T^{(Avg)}_{g,i}(t)}$$

where $R^{(Inst)}_{g,j}$ is a momentary data rate by the schedule subframe t as a CQI feedback function including a modulation coding scheme (MCS). $T^{(Avg)}_{g,j}(t)$ is an average throughput smoothed by a linear low pass filter in the scheduling subframe t of the i-th UE communicating with the g-th Node-B.

The average throughput $T^{(Avg)}_{g,j}(t)$ is calculated as follows. The scheduled UE is given by the following equation.

$$T^{(Avg)}_{g,i}(t) = \Omega \cdot T^{(Avg)}_{g,i}(t-1) + (1-\Omega) \cdot R^{(Inst)}_{g,i}(t)$$

The UE not scheduled is given as follows $$T^{(Avg)}_{g,i}(t) = \Omega \cdot T^{(Avg)}_{g,i}(t-1)$$

where $\Omega$ is given as follows.

$$\Omega = 1 - \frac{T_{Frame}}{T_{Window}}$$

where $T_{window}$ indicates an average window in time units of second, and $T_{Frame}$ indicates the length of the frame of the system (in second).

<Proportional Equality Scheduler with User Grouping>

The principle of the user grouping is to divide the entire UEs into two groups one of which belongs to an inferior user group whose user throughput is to be improved while the other of which belongs to a superior user group whose user throughput satisfies a system request. In each group, the scheduler operates to determine the channel resources corresponding to each active UE.

Figure 8:
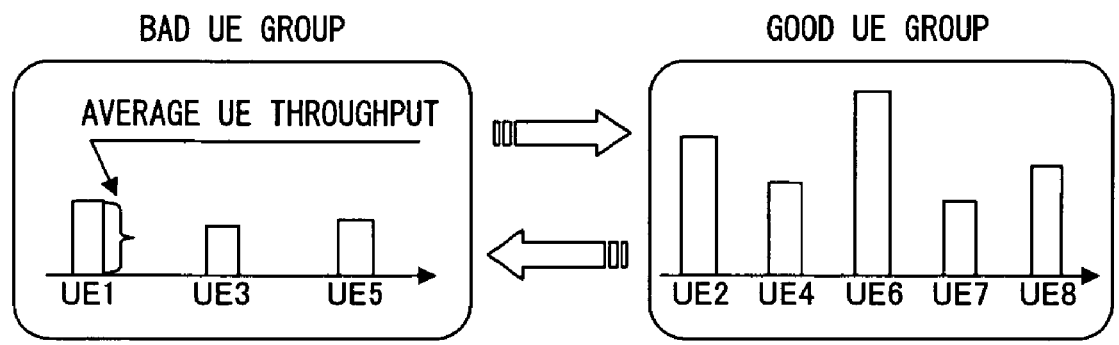
FIG. 8 is an explanatory view (1) showing UE grouping.

FIGS. 8 and 9 are explanatory views showing an example of user grouping.

There are a total of eight UEs. UEs 1, 3, and 5 belong to a worse UE group, and UEs 2, 4, 6, 7, and 8 belong to a better UE group. In this example, the average throughput of each UE belonging to the worse UE group is constantly lower than that of the better UE group.

Each time the average UE throughput changes, the group to which UEs belong is updated. For example, in FIG. 9, since a newly transmitted transmission packet brings about higher average throughput of the UE 1 than the throughput of the UE 7, the scheduler has to change the UE state between the groups.

The parameters to be defined in the scheduler for UE grouping are as follows.

$T^{(TGT)}$: UE target throughput that can be statistically or semi-statistically configured and used in determining the UE state.
$U^{(WG)}_g$: The number of UEs of the worse UE group of the g-th Node-B that largely depends on the channel state and the target throughput.
$U^{(BG)}_g$: The number of UEs of the better UE group of the g-th Node-B.
$T^{(Avg)}_{g,j}(t)$: The average throughput of the j-th UE communicating by the g-th Node-B in the subframe.

Figure 10:
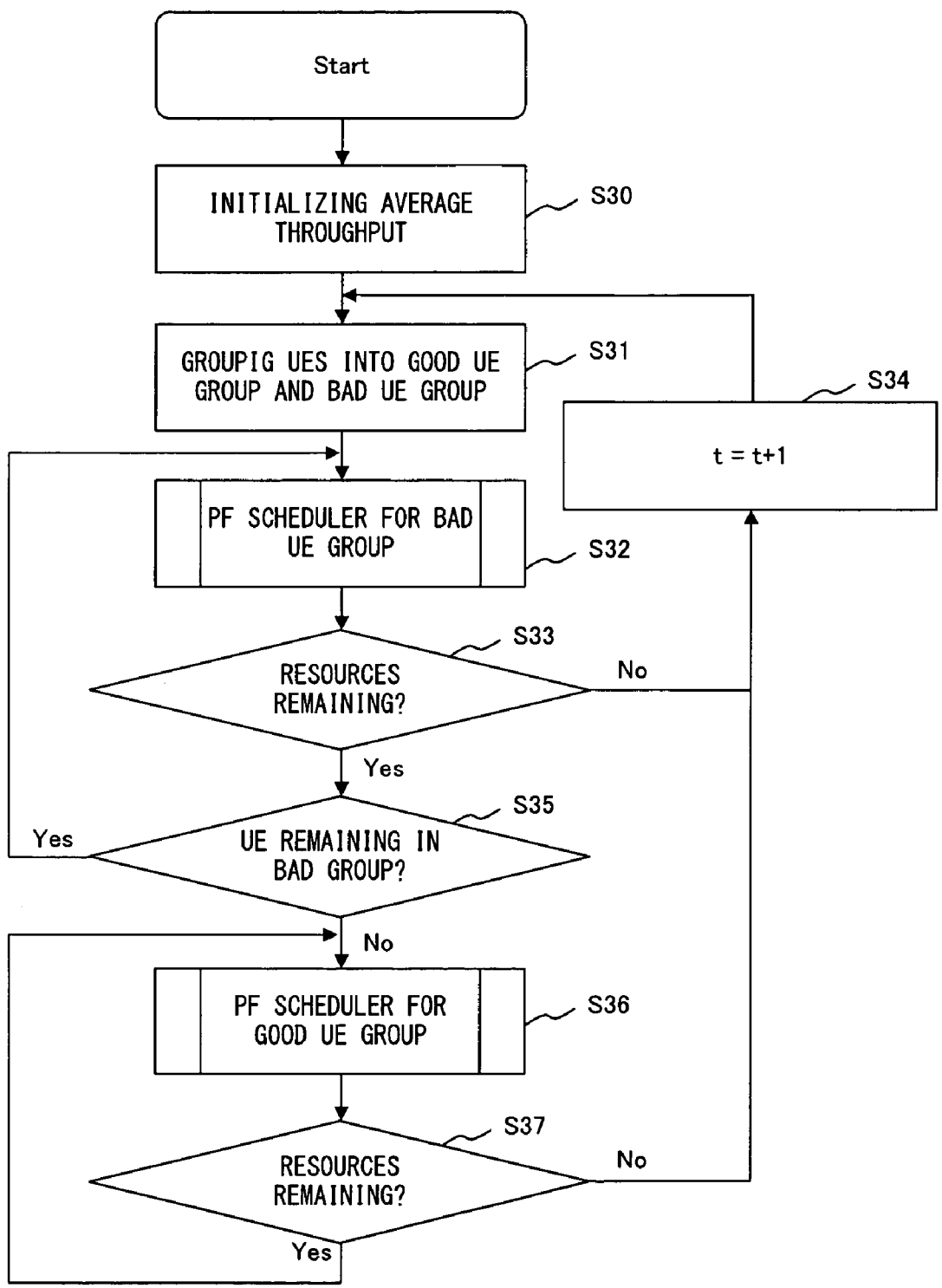
FIG. 10 shows the process flow of fractional frequency reuse control based on the step function for UE grouping.

FIG. 10 is a detailed flowchart of the grouping and scheduling of a user and a channel resources.

UE Grouping Process:

In the initial UE grouping state, all UEs are arranged in the worse group, and average throughput $T^{(Avg)}_{g,j}(t)$ is always set to 1.0 (step S30).

To update the UE grouping state, the average throughput $T^{(Avg)}_{g,j}(t)$ is compared with the target throughput $T^{(TGT)}$ for all UEs.

When the acquire throughput $T^{(Avg)}_{g,j}(t)$ is lower than the target value $T^{(TGT)}$, the UE is arranged in the worse UE group. Otherwise, the UE is arranged in the better UE group (step S31).

Process of Assigning an Active UE and a Channel Resource (step S32):

The scheduler selects a candidate for a UE from the worse UE group.

The scheduler calculates the metric $\Phi_{g,j}(t)$ in the worse UE group for all resources.

The resource is assigned to a UE of higher metric, and it is determined in step S33 whether or not the resource remains. If it is determined in step S33 that the resource does not remain, then control is passed to step S34, the frame time t is updated to t+1, and control is returned to step S31. If the determination in step S33 is YES, then it is determined in step S35 whether or not there is a UE remaining in the worse UE group. If the determination in step S35 is YES, then control is returned to step S32. If the determination in step S35 is NO, then control is passed to step S36.

In step S36, a similar schedule is performed on the better UE group, and it is determined in step S37 whether or not there is resources remaining. If the determination in step S37 is NO, then control is passed to step S34. If the determination in step S37 is YES, then control is returned to step S36.

The basic advantage of the UE grouping on the basis of the scheduler is that the scheduler can reserve the user coverage performance on all UEs, thereby assigning good channel resources to UEs of the worse UE group over the entire band width.

When the interference profile of the UE is known, the scheduler of Node-B assigns the appropriate band for the transmission of data to the UE to the transmission data to the UE with the quality of the communication with the UE taken into account. It is the function of a normal scheduler performing scheduling upon receipt of the report of an amount of interference from the UE.

Figure 11:
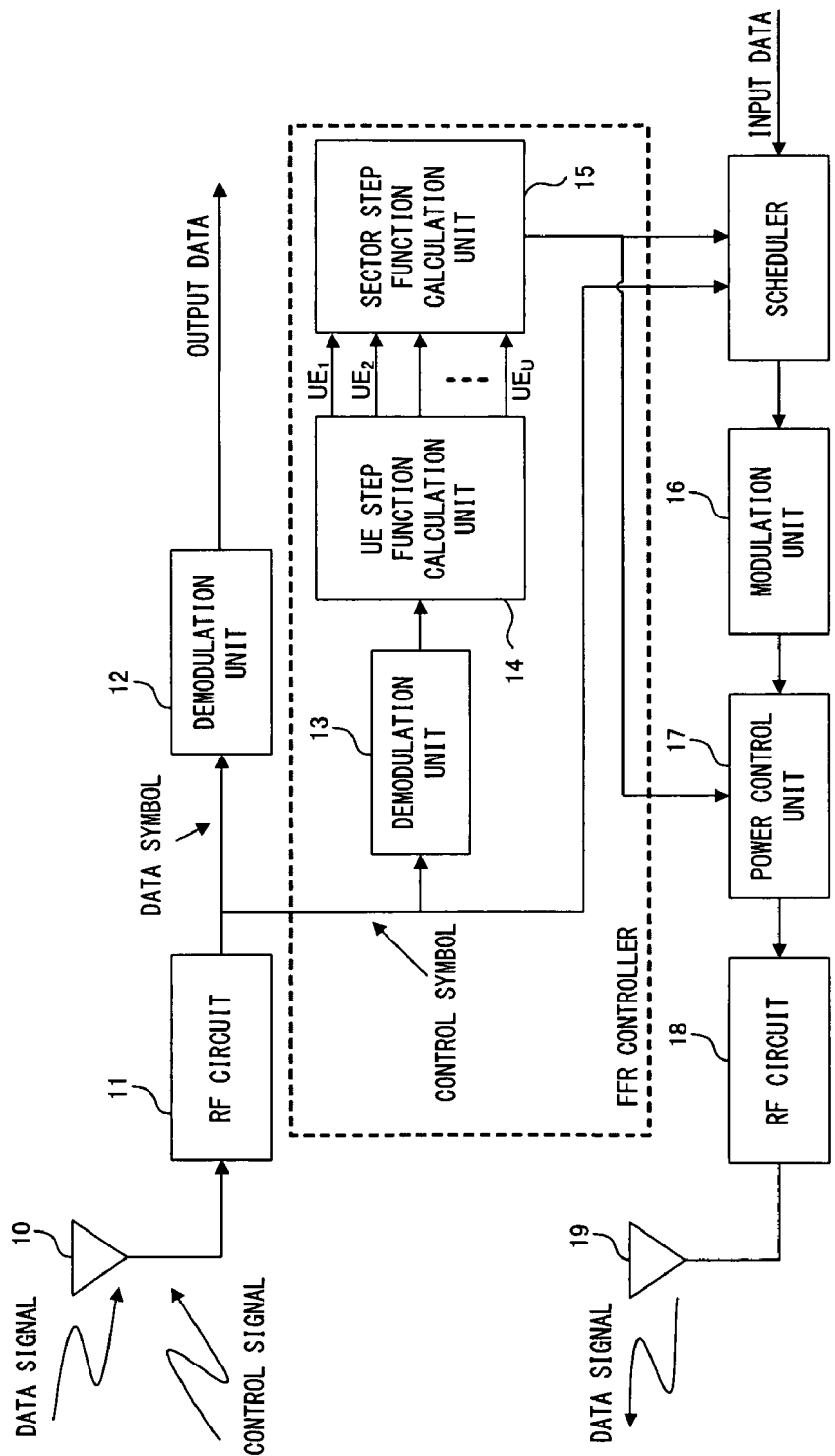
FIG. 11 shows the configuration of the block diagram of the Node-B according to an embodiment of the present invention.
Figure 12:
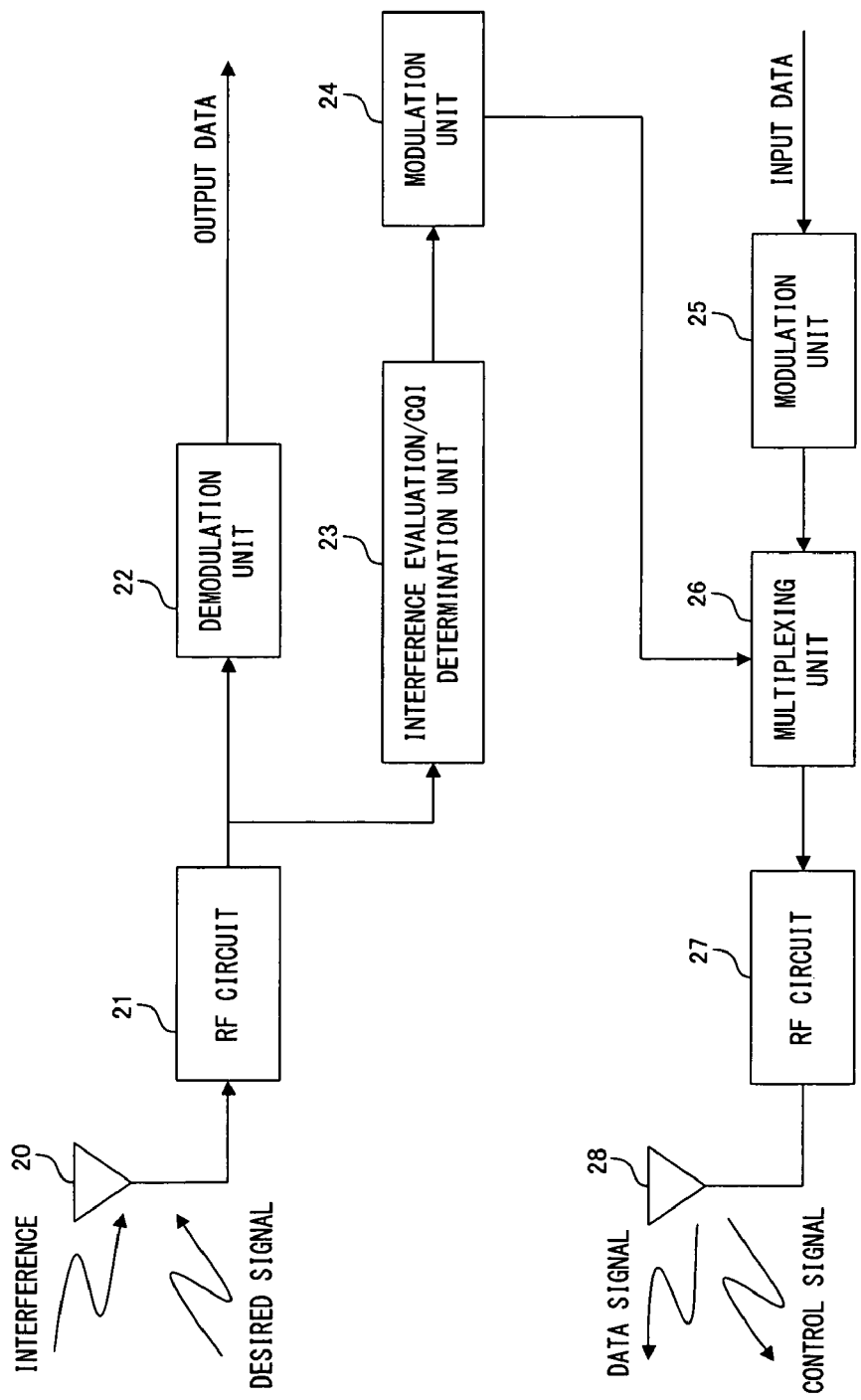
FIG. 12 shows the configuration of the block diagram of a UE according to an embodiment of the present invention.

FIG. 11 is a block diagram showing the configuration of Node-B. FIG. 12 is a block diagram of the configuration of a UE.

In FIG. 11, the data signal and the control signal are received by a antenna 10, and downconverted by an RF circuit 11. The downconverted data signal is demodulated by a demodulation unit 12, and output as output data. The downconverted control symbol is demodulated by a demodulation unit 13. After the demodulation, a UE step function calculation unit calculates a step function. A UE step function is calculated for each of $UE_1$ through $UE_U$. Using the UE step function, the sector step function calculation unit calculates a sector step function. The input data input to a modulation unit 16 is modulated by the modulation unit 16, and input to a power control unit 17. The power control unit 17 obtains information about the sector step function from a sector step function calculation unit 15, controls the power of each subchannel, and inputs the result into an RF circuit 18. The RF circuit 18 converts a signal into a radio band, and outputs the result from an antenna 19.

In FIG. 12, interference and a desired signal from desired Node-B are received by an antenna 20. The signal received through the antenna 20 is downconverted by an RF circuit 21, demodulated by a demodulation unit 22 as output data. The amount of interference of the downconverted signal is evaluated by an interference evaluation/CQI determination unit 23, and the input data is modulated by a modulation unit 25. A multiplexing unit 26 multiplexes the modulated input signal with the modulated interference amount signal. An RF circuit 27 converts the signal into a radio band. and the result is transmitted as a data signal and a control signal from an antenna 28.

The process shown in FIG. 5 is performed by a UE step function calculation unit 14 shown in FIG. 11. The process shown in FIG. 6 is performed by a sector step function calculation unit 15 shown in FIG. 11. The process shown in FIG. 10 is performed by a MAC control unit of an upper layer not shown in the attached drawings.

Other Embodiments

In other embodiments, for example, a radio base station 9 having the configuration shown in FIG. 11 forms a radio area. Around the radio base station 9, other radio base stations form adjacent radio areas. Other radio base stations have configurations similar to the configuration of the radio base station 9.

A radio base station adjacent to the radio base station 9 is allowed to transmit data using frequency bands overlapping in predetermined frequency bands. That is, it is allowed to perform fractional frequency reuse.

However, in this system, the radio base station 9 and a adjacent radio base station transmit data using the respective frequencies F1 and F2 in a period T1, and the radio base station 9 and the adjacent radio base station use the frequencies F1 and F2 in a period T2, thereby realizing adaptive FFR without restrictions of reuse of fixed transmission frequencies.

That is, the radio base station 9 receives from a plurality of mobile stations 10, demodulates a report of a reception environment in a predetermined frequency band measured (refer to 13 shown in FIG. 12) in each of the plurality of mobile stations 10, and sets the correspondence between the transmission frequency and the transmission power in a predetermined transmission frequency band according to the report acquired from the plurality of mobile stations 10 (refer to 14 and 15 shown in FIG. 12).

The setting is reflected in the transmitting process by the control of the power control unit 17. That is, the process of transmitting data to the mobile stations 10 on the basis of the correspondence is performed. The mobile station 9 can measure the reception environment according to a pilot signal (known signal) transmitted by the radio base station 9. The pilot signal can be transmitted with the transmission power substantially unchanged depending on the frequency.

The reception environment of the mobile stations 10 degraded by the interference (refer to (2) shown in FIG. 7) according to a radio signal from a adjacent radio base station. The SINR is indicated by (3) shown in FIG. 7. As indicated by (2) and (3) shown in FIG. 7, the reception environment measured by the mobile stations 10 is reported to the radio base station 9, and received and demodulated as described above.

The sector step function calculation unit 15 of the radio base station 9 applies low transmission power to the frequency at which the reception environment has been relatively degraded on the basis of the report of the reception environment from a plurality of subordinate mobile stations, and applies high transmission power to the frequency at which the reception environment is relatively good.

In the example shown in FIG. 7, the correspondence between the frequency and the transmission power can be set with the vertical axis of (3) assumed as the transmission power.

In this case, the report of a mobile station of a high priority can be dominantly used in setting the correspondence, and the correspondence can be set depending on the retransmission interval acquired by performing an averaging process on all mobile stations described in the report.

A scheduler 29 that has received the report of the reception environment from one subordinate mobile station selects a frequency to be assigned to the mobile station on the basis of the reception environment acquired by correcting the report of the reception environment from the subordinate mobile station on the basis of the correspondence (that can be expressed by a function other than a step function) calculated by a sector step function calculation unit. For example, the report from the mobile station refers to the SINR etc. obtained by measurement according to a pilot signal, and has no effect of the power control by a sector step function calculation unit. Therefore, since "S" increases by the power control by the sector step function calculation unit, the SINR as a reception environment is increased for each frequency, thereby performing correction. Thus, the improvement of the reception environment for power control can be considered when a frequency is assigned. When a frequency is assigned, a frequency at which reception quality is preferable can be selected on the basis of the corrected reception environment (SINR).

When data is transmitted to the mobile station, the selected frequency and the transmission power associated with the frequency selected from the correspondence can be applied to a transmission signal. That is, the power control unit 17 can transmit data depending on the correspondence by providing transmission data for a modulation unit so that the data addressed to the mobile station can be transmitted at the selected frequency (and timing).

When a frequency is selected, it is desired that a frequency at which data reception quality is high (relative evaluation of predetermined reference, or relative evaluation of entire reception quality can be considered).

The correspondence can be set between each of a plurality of fractional frequency bands configuring a predetermined frequency band and transmission power. That is, when the vertical axis of (3) shown in FIG. 7 is transmission power, the transmission power can be differently set for each fractional frequency band. Thus, the transmission power can be controlled for each fractional frequency, thereby simplifying the control As for a pilot signal, it is not necessary to reflect the relationship between the frequency calculated by the sector step function calculation unit and the transmission power.

What is claimed is:

1. A communication apparatus comprising:
a controller configured to determine a step function in a fractional frequency reuse for controlling downlink transmission power in a wireless communication system for performing wireless communication with a user terminal, the step function being given by $$p^{(PSD)}(f) = \begin{cases} \alpha_1 \cdot \Delta \cdot \left\lfloor \frac{f}{\Delta} \right\rfloor + \beta_1 & \text{for} \quad 0 \le f < \Delta(M+1) \\ \alpha_2 \cdot \Delta \cdot \left\lfloor \frac{f}{\Delta} \right\rfloor + \beta_2 & \text{for} \quad \Delta(M+1) \le f < \Delta N \end{cases}$$

where $\alpha_1$ and $\alpha_2$ are slopes, $\Delta$ is a step width, f is a frequency, $\beta_1$ and $\beta_2$ are segments, M is a break point as a bending of a step function, and N is a number of steps; and
a transmitter configured to transmit a signal having a power profile according to the step function in a direction of a frequency.

2. The apparatus according to claim 1, wherein
the step function has an odd number of steps and has a break point at a center of bands.

3. The apparatus according to claim 1, wherein
the controller determines a step function with interference amount information obtained with time average transmitted from each user terminal and a limit value of total transmission power taken into account.

4. The apparatus according to claim 3, wherein
the interference amount information is transmitted from a user terminal to the communication apparatus through a dedicated control channel.

5. The apparatus according to claim 3, wherein
the interference amount information is transmitted from a user terminal to the communication apparatus through an existing notification channel relating to the amount of interference.

6. The apparatus according to claim 1, wherein
the controller calculates a frequency profile of an amount of interference of each user terminal by dividing a product of a transmission channel gain and a frequency profile of power of a transmission signal by interference amount information transmitted from each user terminal.

7. The apparatus according to claim 6, wherein
the controller divides user terminals into a group in a bad reception state and a group in a good reception state, assigns a heavier weight to a user terminal belonging to the group in a bad reception state, adds a frequency profile of an amount of interference of each user terminal, and determines a final step function.

8. The apparatus according to claim 7, wherein
the step function compares average throughput of all users with target throughput, and groups a user terminal of the average throughput higher than the target throughput as a user terminal in a good reception state, and a user terminal of the average throughput equal to or lower than the target throughput as a user terminal in a bad reception state.

9. The apparatus according to claim 7, further comprising
a scheduler configured to schedule a transmission signal to each user terminal as a transmission band with communication quality taken into account on the basis of a frequency profile of an amount of interference of each user terminal.

10. The apparatus according to claim 9, wherein
the scheduler selects a user terminal from among user terminals in the group in a bad reception state, and assigns a channel resource by priority.

11. The apparatus according to claim 1, wherein
the controller collects a step function desired by a user terminal determined using an amount of interference accepted by each user terminal, and determines a final step function.

12. The apparatus according to claim 1, wherein
a normal sequential function replaces a step function by generalizing the step function.

13. A communication method, comprising:
determining, by a controller, a step function in a fractional frequency reuse for controlling downlink transmission power in a wireless communication system for performing wireless communication with a user terminal, the step function being given by $$p^{(PSD)}(f) = \begin{cases} \alpha_1 \cdot \Delta \cdot \left\lfloor \frac{f}{\Delta} \right\rfloor + \beta_1 & \text{for} \quad 0 \le f < \Delta(M+1) \\ \alpha_2 \cdot \Delta \cdot \left\lfloor \frac{f}{\Delta} \right\rfloor + \beta_2 & \text{for} \quad \Delta(M+1) \le f < \Delta N \end{cases}$$

where $\alpha_1$ and $\alpha_2$ are slopes, $\Delta$ is a step width, f is a frequency, $\beta_1$ and $\beta_2$ are segments, M is a break point as a bending of a step function, and N is a number of steps; and
transmitting, by a transmitter, a signal having a power profile according to the step function in a direction of a frequency.

14. The method according to claim 13, wherein
the step function has an odd number of steps and has a break point at a center of bands.

15. The method according to claim 13, wherein
the controller determines a step function with interference amount information obtained with time average transmitted from each user terminal and a limit value of total transmission power taken into account.

16. The method according to claim 15, wherein
the interference amount information is transmitted from a user terminal through a dedicated control channel.

17. The method according to claim 15, wherein
the interference amount information is transmitted from a user terminal through an existing notification channel relating to the amount of interference.

18. The method according to claim 13, wherein
the controller calculates a frequency profile of an amount of interference of each user terminal by dividing a product of a transmission channel gain and a frequency profile of power of a transmission signal by interference amount information transmitted from each user terminal.

19. The method according to claim 18, wherein
the controller divides user terminals into a group in a bad reception state and a group in a good reception state, assigns a heavier weight to a user terminal belonging to the group in a bad reception state, adds a frequency profile of an amount of interference of each user terminal, and determines a final step function.

20. The method according to claim 19, wherein
the step function compares average throughput of all users with target throughput, and groups a user terminal of the average throughput higher than the target throughput as a user terminal in a good reception state, and a user terminal of the average throughput equal to or lower than the target throughput as a user terminal in a bad reception state.

21. The method according to claim 19, further comprising
scheduling, by a scheduler, a transmission signal to each user terminal as a transmission band with communication quality taken into account on the basis of a frequency profile of an amount of interference of each user terminal.

22. The method according to claim 21, wherein
the scheduler selects a user terminal from among user terminals in the group in a bad reception state, and assigns a channel resource by priority.

23. The method according to claim 13, wherein
the controller collects a step function desired by a user terminal determined using an amount of interference accepted by each user terminal, and determines a final step function.

\* \* \* \* \*